United States Patent [19]

von Seggern et al.

[11] 4,224,905

[45] Sep. 30, 1980

[54] TWO-CYCLE ENGINE WITH STABILIZED COMBUSTION AND METHOD OF OPERATION THEREFOR

[76] Inventors: Ernest A. von Seggern, 1051 E. Angeleno Ave., Burbank, Calif. 91501; Henry E. von Seggern, deceased, late of Escondido, Calif.; by Blanche von Seggern, executrix, 2310 N. Broadway, Escondido, Calif. 92026

[21] Appl. No.: 909,560

[22] Filed: May 25, 1978

Related U.S. Application Data

[63] Continuation-in-part of Ser. No. 665,512, Mar. 10, 1976, abandoned, which is a continuation of Ser. No. 381,790, Jul. 23, 1973, abandoned, which is a continuation of Ser. No. 204,633, Dec. 3, 1971, abandoned.

[51] Int. Cl.² .................. F02D 35/02; F02B 3/04; F02B 23/10
[52] U.S. Cl. .................. 123/65 WA; 123/65 VC; 123/291; 123/275; 123/287; 123/301
[58] Field of Search ............ 123/32 ST, 32 SP, 75 B, 123/65 VD, 65 WA, 65 VC, 191 S, 191 R

[56] References Cited

U.S. PATENT DOCUMENTS

| | | | |
|---|---|---|---|
| 1,096,405 | 5/1914 | Thomson | 123/65 VD |
| 2,655,906 | 10/1953 | Udale | 123/65 VC |
| 2,808,037 | 10/1957 | von Seggern et al. | 123/32 SP |
| 3,255,739 | 6/1966 | von Seggern et al. | 123/32 ST |
| 3,418,981 | 12/1968 | von Seggern et al. | 123/75 B |
| 3,443,552 | 5/1969 | von Seggern et al. | 123/75 B |

FOREIGN PATENT DOCUMENTS

456092 11/1936 United Kingdom ............ 123/65 WA

*Primary Examiner*—Charles J. Myhre
*Assistant Examiner*—P. S. Lall
*Attorney, Agent, or Firm*—Fulwider, Patton, Rieber, Lee & Utecht

[57] ABSTRACT

A two cycle, spark ignition internal combustion engine of the class having a combustion chamber divided into a relatively small ignition region and a larger combustion region including the cylinder and piston is defined. Substantially stoichiometric fuel-air mixtures are independently supplied to the ignition region in substantially fixed quantity and to the larger region in variable quantity and compressed simultaneously so that the mixtures remain completely separated prior to ignition. The mixtures are stratified with respect to excess air supplied to both regions and to exhaust gases in the engine cylinder, and combustion initiated in the ignition region ignites the variable-sized mixture in the larger region. Burning proceeds from stoichiometric mixtures to lean mixtures as the stratified excess air is mixed into the burning gases. When no fuel is supplied to the large region, the small region functions independently and burns its fuel efficiently. The exhaust gas recycled in the cylinder acts to stabilize the combustion by retaining heat from cycle to cycle at light load and absorbing heat at heavy load.

35 Claims, 10 Drawing Figures

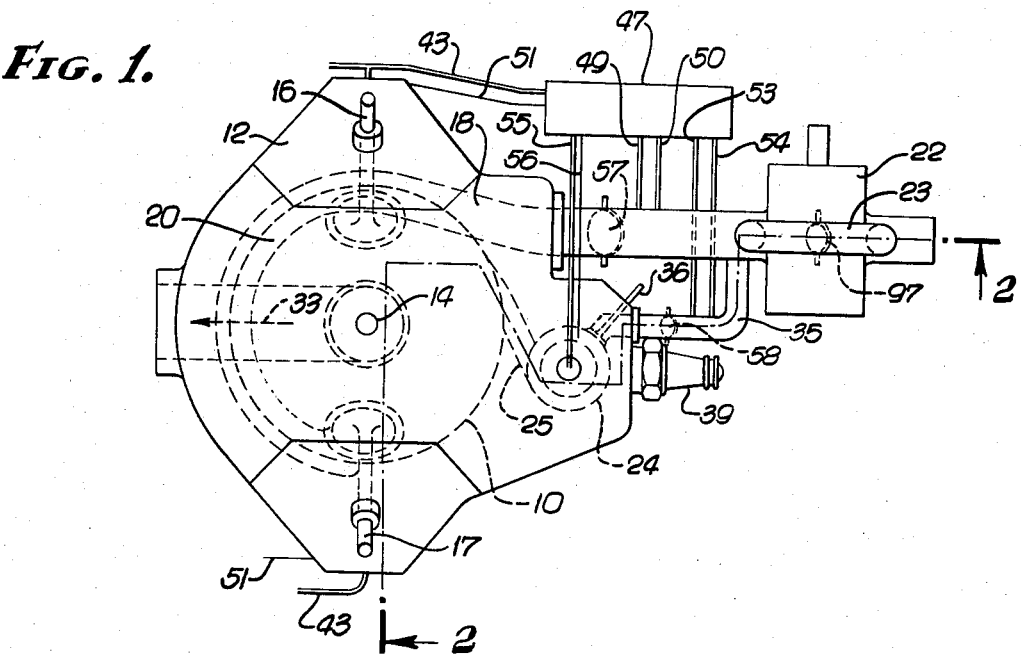

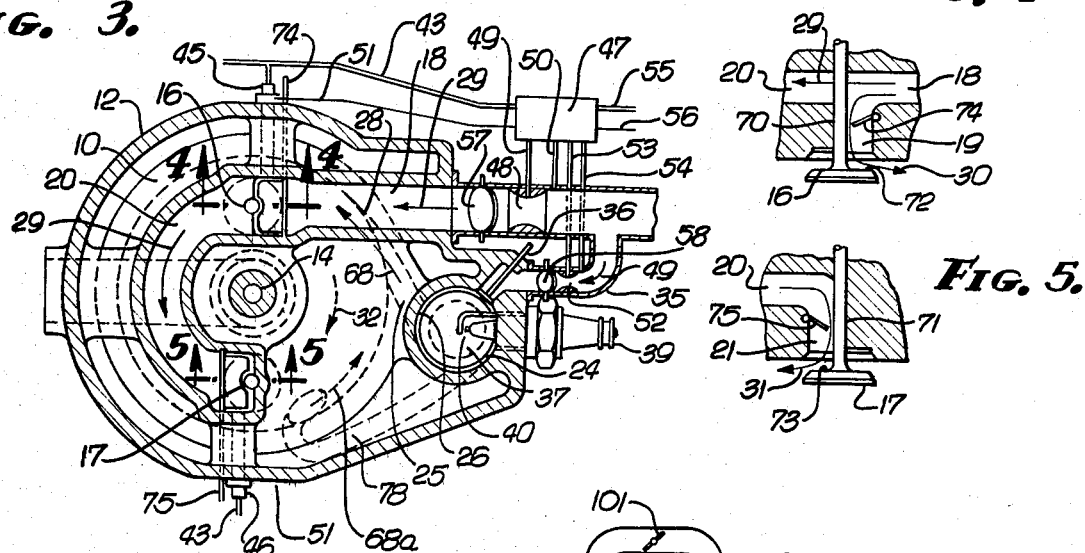
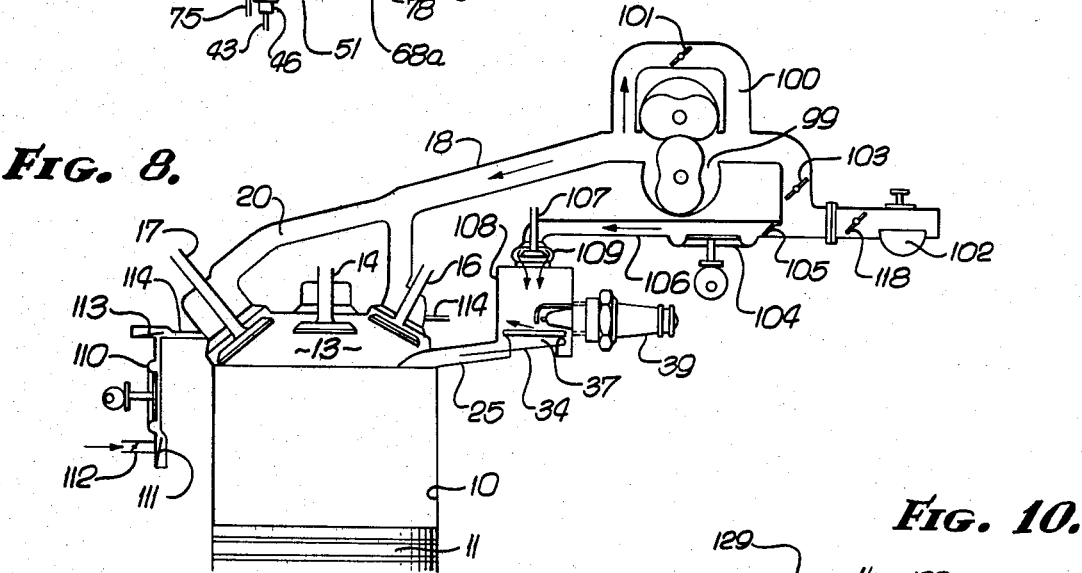
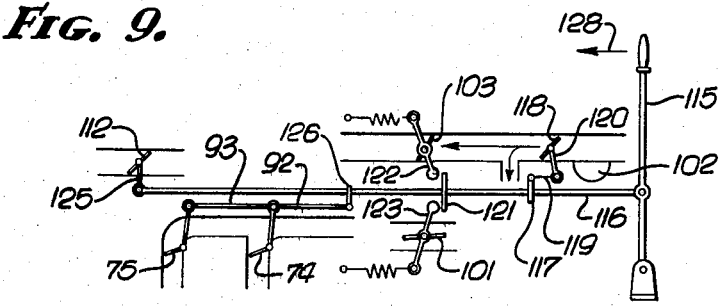

TWO-CYCLE ENGINE WITH STABILIZED COMBUSTION AND METHOD OF OPERATION THEREFOR

CROSS-REFERENCE TO RELATED APPLICATIONS

This application is a continuation-in-part application of our co-pending application entitled TWO CYCLE ENGINE WITH STABILIZED COMBUSTION, Ser. No. 665,512 filed Mar. 10, 1976, to be abandoned, which in turn is a continuing application of our earlier co-pending application entitled TWO CYCLE ENGINE WITH SHIELDED IGNITION CHAMBER, Ser. No. 381,790, filed July 23, 1973, now abandoned which in turn is a continuing application of our earlier co-pending application entitled METHOD AND APPARATUS FOR OBTAINING CLEAN AND EFFICIENT COMBUSTION WITH LOW OXIDES OF NITROGEN IN AN INTERNAL COMBUSTION ENGINE, Ser. No. 204,633, filed Dec. 3, 1971, now abandoned.

FIELD OF THE INVENTION

This invention relates to two cycle, spark ignition internal combustion engines of the type having a divided combustion chamber.

BACKGROUND OF THE INVENTION

The two principle attributes of the ideal internal combustion engine are high thermal efficiency and low emissions. In both four and two cycle engines, the presence of recycled exhaust gas in the combustion chamber interferes with the burning of the fuel-air mixture supplied to the chamber. The problem is particularly acute in two cycle engines at idle and light load.

Conventional engines are particularly low in efficiency at idle and light loads, and current attempts to reduce the emission of $NO_x$, CO and HC tend to reduce the efficiency even lower than in unmodified engines. A basically poor combustion caused by burning fuel in combination with excessive amounts of recycled exhaust gas is the principle cause of both poor effiency and high emissions in conventional engines and it is an object of this invention to provide means whereby fuel is burned in truly stratified relation to recycled exhaust gas and to excess air. It will be shown that whereas two cycle engines in conventional form have been particularly handicapped by excessive emissions, principally of HC, they have, because of the large quantity of recycled exhaust gas inherent in their operation, been low in $NO_x$ emissions. It is an objective of this invention to retain this feature of two cycle engines while obtaining a fast, efficient and clean combustion under all operating conditions.

SUMMARY OF THE INVENTION

The above problems are solved by providing suitable stratification in the engine. Such stratification is obtained with the establishment of an axial circulation in the cylinder by introducing working fluid, consisting of either air or fuel-air mixture, or both, into the cylinder in a peripheral circulation about the cylinder axis, and simultaneously expelling exhaust gas from exhaust outlet means substantially on the axis of said cylinder. Then, a separate fuel-air mixture in a separate but communicating ignition chamber connected to said cylinder is ignited and fires the fuel in the cylinder after the usual compression cycle.

An engine constructed in accordance with the invention may also include a connecting passage to the ignition chamber which joins the cylinder tangentially near the periphery of the cylinder and with an orientation such that the flame from the ignited mixture in the ignition chamber flows into the cylinder creating a circulation about the cylinder axis in a hand of rotation opposite to that caused initially by the introduction of the working fluid. According to one aspect of the invention, the ignition chamber may also be cylindrical, with the connecting passage joining the chamber tangentially on one end thereof, and with fuel supply, either as in injected fuel spray or a pre-mixed fuel-air mixture directed along the axis of said chamber from the opposite end. A spark plug, with its electrodes substantially on the axis of said chamber, may be positioned near the connecting passage.

An engine constructed in accordance with the invention may also include dual inlet valve means located adjacent the periphery of the cylinder and on opposite sides thereof with intake manifold means which direct the entering working fluid into the cylinder to rotate therein in the same hand of rotation. The intake means may also include variable restrictive means near said valves to control the velocity of the entering working fluid. Phasing means may also be provided to admit air and fuel-air mixture in sequence to said valves whereby said air and fuel-air mixture may be stratified with respect to each other in said cylinder.

Also described is a method of charging the ignition chamber either with an injected fuel spray or a fuel-air mixture in such a manner that no fuel from the ignition chamber reaches the cylinder prior to ignition of the charge in said ignition chamber. The invention also includes a method of charging the ignition chamber with stratified air so that there is a triple stratification in the engine, i.e., an initial separation of the fuel into an ignition portion and a variable power portion, and the individual stratification, with respect to excess air and exhaust gas, of the divided fuel charges in both the ignition chamber and the cylinder.

Other features and advantages of the present invention will become apparent from the following detailed description taken in conjunction with the accompanying drawings, which illustrate, by way of example, the principles of the invention.

BRIEF DESCRIPTION OF THE DRAWINGS

FIG. 1 is a plan view of an illustrative engine showing generally the position of the intake and exhaust valves, the ignition chamber, the intake and exhaust passages, control throttles, and a blower;

FIG. 2 is a vertical longitudinal section of the engine taken along the line 2—2 of FIG. 1, showing the intake and exhaust valves in open position during the charging and scavenging cycle;

FIG. 3 is a plan view of the engine as indicated by the line 3—3 of FIG. 2;

FIG. 4 is a vertical cross-section of the first intake valve as indicated by the line 4—4 of FIG. 3;

FIG. 5 is a vertical cross-section of the second intake valve as indicated by the line 5—5 of FIG. 3;

FIG. 6 is a diagram showing the phasing of the compression, expansion, exhaust, scavenging and fuel-air mixture charging cycles during one complete revolution of the engine crankshaft;

FIG. 7 is a diagrammatic drawing showing the control linkage of operating the several butterfly valves to vary the power of the engine;

FIG. 8 is a diagrammatic drawing showing the manifold and blower arrangement when employing a conventional carburetor;

FIG. 9 is a diagrammatic drawing showing the control linkage for operating the engine when using a carburetor; and FIG. 10 is a diagrammatic drawing showing an alternate form of ignition chamber for the embodiment shown in FIG. 8.

DETAILED DESCRIPTION OF AN ILLUSTRATIVE EMBODIMENT

The illustrative engine of FIGS. 1 to 7 is shown with a single water-cooled cylinder and is of the two cycle type, but may be provided with air cooling and have multiple cylinders. A cylinder 10 has a piston 11 reciprocating therein. A cylinder head 12 fastened to the top of the cylinder has a combustion chamber 13 therein shown in a somewhat flattened hemispherical form, and an exhaust valve 14 is fitted in the flattened top of chamber 13, substantially coaxial with the length axis 15 of the cylinder. Two intake valves 16 and 17 are fitted on each side of the exhaust valve, with their stems inclined from the cylinder axis at an angle of approximately 40 degrees to blend the valves into the spherical sidewalls of the combustion chamber. The valves are operated in the usual manner by valve gear (not shown) timed in a sequence to be described.

The intake manifold 18 joins the intake valve 16 as shown in FIG. 4 where it divides into a downward branch 19 and a horizontal extension 20 which joins the intake valve 17 in a similar downward passage 21 shown in FIG. 5. A blower 22, which may be of the Roots type as shown, is joined to the end of manifold 18, and includes a by-pass passage 23.

An ignition chamber 24 substantially cylindrical in form, with its length axis parallel to axis 15, is joined to the combustion chamber 13 by a passage 25. This passage joins the ignition chamber tangentially at a point 26 which is at the bottom 27 of said chamber and joins the combustion chamber tangentially near the periphery of cylinder 10 at a point 28 between valves 16 and 17. When the exhaust valve 14 and the intake valves are open, as shown in FIG. 2, air from blower 22 flows through manifold 18 as shown by arrow 29 and a portion enters the cylinder through valve 16 as indicated by arrow 30 and the remainder enters the cylinder through valve 17 as indicated by arrow 31 as shown in FIGS. 4 and 5, respectively. As shown in FIG. 3, this creates a clockwise circulation indicated by arrow 32 in the cylinder, and simultaneously displaces exhaust gas out through the axially positioned exhaust valve 14 as shown by arrows 33. The passage 25 is positioned so that a portion of the circulating flow passes directly up said passage into the ignition chamber without restriction or abrupt change of direction as indicated by arrow 34. This flow takes place during the compression cycle after the intake valves and exhaust valve have closed.

The ignition chamber is also connected to the intake manifold 18 by a short passage 35 and air, as shown by arrow 44, is admitted to the ignition chamber through intake valve 36 which is also open during the time valves 16 and 17 are open. This air purges the chamber of exhaust gases during the scavenging cycle. Included in the ignition chamber is an axially positioned raised plug 37, with rim 38, extending upwardly from the bottom thereof, a spark plug 39 with its electrode 40 projecting substantially to the axis of said chamber and placed slightly above said plug, and a fuel injector 41 in the top. It is designed to inject atomized fuel downwardly in a cylindrical body toward the spark plug 39 as shown by dotted lines 42.

A pair of additional fuel injectors 45 and 46 are provided to inject atomized fuel into passages 19 and 21, respectively, in close proximity to intake valves 17 and 18. The three injectors are part of a conventional electronic manifold fuel injection system which includes a control box 47, a venturi 48 in manifold 18 and connecting tubes 49 and 50, a fuel line 43 to injectors 45 and 46 with electrical connection 51 to actuate both injectors simultaneously, and a similar venturi in passage 35 with connecting tubes 53 and 54 and a fuel line 55 to injector 39 and the electrical connection 56.

A throttle 57 in manifold 18 controls the flow of air into cylinder 10 and a throttle 58 in passage 25 controls the flow of air into the ignition chamber 24. The engine operates in two modes, namely, for idle and light load, only the ignition chamber receives fuel, and the amount of power developed is controlled by throttle 58, and when more power is required, throttle 57 is also opened and combustion takes place in the chamber 13 as well, this fuel being ignited by the flame issuing from the ignition chamber through passage 25. The fuel-air mixture in both chambers is basically stoichiometric, but to insure a complete burning each mixture body is substantially surrounded by excess air so that at the end of burning excess oxygen is available to reduce HC and CO residues to an absolute minimum.

The cyclic sequence of events is shown in FIG. 6. The power cycle 59 extends for about 120 degrees after TDC. Then the exhaust valve 14 opens for the interval 60. Shortly after the exhaust valve opens, the three intake valves, 16, 17 and 36 open for the interval 61 which ends a little after the exhaust valve closes. Compression then begins for the interval 62 up to about TDC where combustion is initiated. When fuel is injected into the manifolds 19 and 21, it takes place during the interval 63 forming a fuel-air mixture as the air passes into the cylinder. When fuel injection is terminated, air continues to flow into the cylinder for the interval 64. This produces a three body stratification in the cylinder of air 65, fuel-air mixture 66 and exhaust gas 67 shown ideally by the three zones indicated by dotted lines. Some air is admitted to the cylinder at all times whether combustion takes place in the combustion chamber 13 or not, and during compression some of the air is compressed into the ignition chamber as indicated by arrow 34. This air circulates around the plug 37 and on upwardly around the periphery of the chamber. During the interval 69, fuel is injected into the chamber as indicated by the envelope 42 inside the circulating air body, forming a stratified body of fuel-air mixture surrounded by air.

When this mixture is ignited it sends a tongue of flame down passage 25 into chamber 13, as shown by arrow 68, to impinge directly on the fuel-air mixture (if any) and air circulating therein as it attempts to establish an axial circulation in the opposite hand of rotation. This produces a fast reaction because of the turbulence and also reduces heat losses to the cylinder walls by reducing scrubbing losses due to high velocity circulation.

When the engine is operating on combustion in the ignition chamber alone, the size of the mixture body formed varies from a minimum at idle to one which substantially fills the chamber after compression. In order to obtain a pollution-free combustion, it is imperative that no small amounts of fuel escape into the large body of recycled exhaust gas in the cylinder because it is quite impossible to burn this scattered fuel when mixed with the exhaust. Accordingly, the fuel is injected into the ignition chamber only after the compression cycle has begun and an inward flow of air is coming up passage 25. The size of the fuel-air mixture body is increased gradually and restricted to one which does not over-fill and over-flow the ignition chamber and its passage during the compression cycle. The fuel is injected at a rate to match the air being compressed into the chamber because at atmospheric pressure a full charge of fuel-air mixture would over-fill the ignition chamber many times. When, on the other hand, fuel is put into the cylinder through the intake valves 16 and 17, it enters as a stratified body, and is compressed as a stratified body, to be ignited and burned in the presence of the excess air also introduced at the same time, in a localized combustion little affected by the exhaust gas in the cylinder. At this time the ignition flame has been increased to its maximum size and is easily capable of finding and igniting the stratified fuel mixture.

The successful operation of the engine depends to a large degree on the stratification obtained in both the cylinder and combustion chamber 13 and the ignition chamber 24. In the cylinder, the axial circulation is established by means of the dual intake valves 16 and 17 and the associated intake manifold, shown in detail in FIGS. 4 and 5. In a conventional poppet valve and manifold arrangement, the entering gas divides around the valve stems when entering the cylinder which creates a turbulence in the flow and impairs the smooth, symmetrical laminar flow required in the cylinder to provide the best stratification. The passages 19 and 21 are accordingly made like a half-circle in section, with the valve stems 70 and 71 lying along the diameter. The entering gas is directed toward the undersides 72 and 73 of said valves and is deflected to the side in a smooth U-shaped flow shown by arrows 30 and 31. When operating at light load and low speed, the velocity of the entering gases is maintained by means of the hinged valves 74 and 75 which, when partially closed as shown in FIGS. 4 and 5, direct the gas through the narrow opening formed and against the flat wall corresponding to the diameter of the manifold section. A further restriction to the gas flow is provided by the pockets 76 and 77 which partially enclose the respective valves when open and act to direct the entering gases toward the cylinder walls and at the same time screen the entering gases from the exhaust gases which are leaving the cylinder through exhaust valve 14 at the same time.

Stratification in the ignition chamber is enhanced by means of the raised plug 37 about which air entering from the cylinder during compression is directed to circulate before entering the upper region containing the spark plug 39. The rim 38 restricts the annular space around the plug and distributes the circulating air uniformly to the upper regions of the chamber. A similar effect can be obtained by having dual inlet passages (like the dual passages to the cylinder), the additional passage being shown by dotted lines 78. It has its opening into the cylinder arranged to direct the ignition flame, as shown by arrow 68a, into the cylinder in the same hand of rotation as arrow 68 in passage 25, and thereby enhances the counter-rotation effect for improved turbulence and burning.

The position of the spark plug in the ignition chamber is such that the electrodes 40 are substantially on the axis of the chamber where the fuel-mixture is located, and out of the flow path of the entering air stream 34. It is also positioned close to the outlet of the chamber so that when combustion begins the expanding gases do not displace unburned fuel-air mixture out into the cylinder ahead of the ignition flame to get lost in the residual gases.

The control means for varying the power of the engine are shown in FIG. 7. A lever 79 actuates rod 80, to which are attached a first lug 81 and a second lug 82. Lug 81 has a hole 83 through which a rod 84 passes in a slidable manner and a spring 85 on said rod holds a collar 86 against said lug. Rod 84 connects to arm 87 of throttle 58 and when lever 79 is moved to the left as shown by arrow 88, said throttle is opened. When arm 87 engages stop 89, the throttle remains open and further motion to the left makes lug 82 engage arm 90 and opens throttle 57 by stretching spring 91 and compressing spring 85. Also connected to rod 80 are links 92 and 93 which actuate arms 94 and 95 valves 74 and 75, respectively. These valves also open as lever 79 is moved to the left. An additional link 96 to control box 47 correlates the fuel injection with the throttle opening as described. Rod 80 also controls the throttle 97 in the blower by-pass passage 23 by means of lever arm 98. This by-pass is provided when a blower of fixed displacement is driven in a direct drive from the engine. Controlling the amount of air delivered to the engine by throttling the intake is wasteful and the by-pass allows the excess air pumped to recycle through the blower without appreciable energy loss. It makes the engine free-running at idle and light load.

When operating at idle and light load, no fuel is supplied to the combustion chamber and the engine operates with the small fuel charge localized in the ignition chamber, where it burns efficiently as though it were in a small engine, unhampered by the residual exhaust gas in the rest of the engine. When the idle charge is burned efficiently, the quantity of fuel burned and heat released per cycle is very small, and every effort is made to retain the heat in order to maintain an operating cycle hot enough to prevent quenching of the flame before combustion is completed. The two cycle engine retains its exhaust in the cylinder and recompresses and thereby reheats the gas to near combustion temperature in a reversable thermic cycle, and when the small flame from the ignition chamber enters the combustion chamber it encounters near combustion temperatures. Only as much exhaust gas is ejected as is added by the small combustion on each new cycle so that a large reservoir of heat is retained in the cylinder. The excess air which is introduced into the ignition chamber in stratified relation to the fuel charge therein, enters the engine through the cylinder and is heated by the residual exhaust gas therein before reaching the ignition chamber. The excess air in the cylinder is stratified relative to the exhaust gas therein whether fuel mixture is also introduced to the cylinder or not.

In a two cycle engine, the fuel charge introduced into the cylinder displaces an equivalent quantity of exhaust gas so that under normal loading, such as cruising in an automobile, the quantity of exhaust gas retained per cycle is large enough to serve as a heat sink relative to the heat being released by the quantity of fuel being burned. This action is effective in limiting excessive temperature rise and thereby minimizes the formation of $NO_x$. The recycled exhaust thereby provides a stabilized combustion which is heat limited under load and heat augmented at idle and light load.

The engine may be modified in several exemplary ways. It is possible to operate without the connecting passage 35 and valve 36 by relying entirely on air compressed into the ignition chamber from the cylinder during the compression cycle. It may also be operated with only one injector supplying fuel to the cylinder through one intake valve, and with only one intake valve. Also, the sequence of fuel-air mixture and excess air introduction into the cylinder during the scavenging and charging cycle may be reversed. In place of having the air enter after the mixture, it can be put in before the mixture, by simply changing the time of fuel injection relative to the opening of the intake valve.

It is also possible to structure the engine to operate with a conventional carburetor. The basic cycle remains the same, but the manner of introducing the fuel and excess air are modified. Since the fuel-air mixture is formed outside of the engine, the introduction of the mixture during the compression cycle requires a means of pre-compression. The mixture can be introduced during approximately the first half or third of the compression cycle so that the pre-compression pressures are not very high and correspond to a high degree of supercharging, but is applied only to the relatively small ignition charge and does not require much power. A schematic arrangement is shown in FIG. 8. A similar blower 99 with by-pass 100 and control valve 101 is provided to deliver a fuel-air mixture when carburetor 102 to the cylinder and combustion chamber 13 when valve 103 is open. The fuel-mixture supply means for the ignition chamber is shown with a diaphragm type displacer 104 (although other means may be used), a check valve 105, a connecting passage 106 and an inlet valve 107 to the ignition chamber 108. The ignition chamber is basically similar to chamber 24, but the inlet valve is now on the vertical axis of the chamber and is enclosed partially by a shroud 109 which directs mixture entering the chamber to flow down the center while air, in a stream 34 as before, enters and circulates around the periphery of the chamber. The phasing of events is the same as in FIG. 6 except that the segment 69 which represented fuel injection, now represents fuel-mixture introduction.

A separate excess air supply is also provided, shown here as a diaphragm type pump with diaphragm 110, inlet valve 111, control throttle 112, discharge valve 113 and connecting passage 114 which delivers air close to the valves 16 and 17. The air, at a pressure in some excess of that in manifold 18, can be delivered either when the valves 16 and 17 open, or just before they close, displacing momentarily, the fuel-air mixture in the manifold.

The control mechanism shown in FIG. 9 differs somewhat from that shown in FIG. 7, but the basic operation remains the same. The lever 115 actuates a rod 116 to which is attached a first lug 117 which operates throttle 118 by means of link 119 and arm 120, a second lug 121 which engages arm 122 of valve 103 and arm 123 of control valve 101, an arm 125 which operates air pump throttle 112 and a third lug 126 which operates valves 74 and 75 by means of links 92 and 93 connected to arms 94 and 95 respectively. In operation, lever 115 is moved to the left, as shown by arrow 128, to open carburetor throttle 118 slightly while valve 103 is closed and by-pass control 101 is open. Also opened slightly are air pump throttle 112 and valves 74 and 75. All the mixture from the carburetor is delivered by pump 104 to the ignition chamber. The maximum capacity of the pump is just sufficient to fill the ignition chamber, and when this capacity is reached, the second lug 121 begins to open valve 103 and close control 101 so that the blower begins to deliver fuel mixture to the cylinder 10. Further movement of lever 115 simply increases the volume of mixture delivered to the cylinder while the ignition chamber charge remains substantially constant.

An alternate form of ignition chamber is shown in FIG. 10. In the ignition chamber 108 of FIG. 8, the fuel-air mixture was placed along the axis of the cylindrical ignition chamber, while the air entered tangentially and circulated around the fuel body. In the alternate design, the air from the cylinder enters the ignition chamber 129 axially through passage 130 as shown by arrow 131 while fuel-air mixture is supplied through inlet valve 132 and is directed tangentially into said chamber by the manifold 133 to circulate around said air as indicated by arrow 134. The spark plug 135 has its electrodes 136 near the periphery of said chamber and the plug is placed near the air inlet passage 130 as before.

As an example of an engine which has operated according to the invention described, the displacement may be about 21 cubic inches, the compression ratio 8 to 1, and the capacity of the ignition chamber about ¼ that of the main combustion chamber. These dimensions and ratios are not limitations on the scope of the invention, but merely set forth the parameters of one engine constructed as set forth above that embodies the invention. While the two cycle engine described is a preferred form of the engine, it is understood that most of the features illustrated and described may also be applied to four cycle engines. In the embodiment illustrated, the engine has no cylinder ports, as in conventional two cycle engines, but has poppet valves for both intake and exhaust means, and may have a conventional closed crankcase with oil as in the usual four cycle engine practice.

It is understood that the engine is not limited to the precise structure shown, but also includes such modifications as may be embraced within the scope of the appended claims.

We claim:

1. In an internal combustion engine of the two cycle, spark ignition type, having a cylinder and a piston, a combustion chamber opposite said piston, exhaust expulsion means substantially on the axis of said cylinder, and an ignition chamber separate from said combustion chamber but in direct communication through a connecting passage, the combination of:
    means for dividing the fuel supplied to said engine into an ignition portion for said ignition chamber and a power portion for said combustion chamber, to effect a first stratification;
    means to establish an axial circulation in said cylinder with a fuel-air mixture circulating around axially positioned exhaust gas, in a second stratification;
    means to sequentially introduce excess air into said cylinder to establish an axial circulation therein about said axially positioned exhaust gas and also separated from said fuel-air mixture in a third stratification; and means to establish an axial circulation in said ignition chamber, with excess air circulating around an axially positioned fuel-air mixture to establish a fourth stratification in said engine.

2. In an internal combustion engine of the two cycle, spark ignition type, having a cylinder and a piston, the combination comprising:
a combustion chamber opposite said piston substantially in the form of a figure of revolution about the longitudinal axis of said cylinder;
an exhaust valve opening into said combustion chamber,
working fluid intake means opening into said combustion chamber;
intake manifold means for cooperating with said intake means to direct working fluid entering said cylinder therethrough to flow substantially tangentially into said cylinder and circulate therein about said cylinder axis and adjacent said cylinder walls;
movable working fluid flow restriction means associated with said manifold means for maintaining the velocity of the working fluid entering said cylinder through said intake means as the rate at which the working fluid enters said cylinder decreases;
an ignition chamber separate from said combustion chamber with a volume small relative to said combustion chamber; and
a connecting passage joining said ignition chamber to said combustion chamber at a point near the periphery of said cylinder, whereby the circulating working fluid is stratified relative to residual exhaust gas from a prior cycle of operation, distributed along said cylinder axis and during the subsequent compression cycle the working fluid is compressed, at least in part, into said ignition chamber through said connecting passage and substantially all residual exhaust gas is excluded therefrom.

3. In an internal combustion engine of the two cycle spark ignition type having a cylinder and a piston, the combination comprising:
a combustion chamber opposite said piston substantially in the form of a figure of revolution about the longitudinal axis of said cylinder;
an exhaust valve opening into said combustion chamber substantially on said axis;
working fluid intake means opening into said combustion chamber in close proximity to the periphery of said cylinder;
intake manifold means for cooperating with said intake means adapted to direct working fluid entering said cylinder therethrough to flow substantially tangentially into said cylinder and circulate therein about said cylinder axis and adjacent said cylinder walls;
movable working fluid flow restriction means associated with said manifold means for maintaining the velocity of the working fluid entering said cylinder through said intake means as the rate at which the working fluid enters said cylinder decreases;
an ignition chamber separate from said combustion chamber, with a volume small relative to said combustion chamber; and
a connecting passage joining said ignition chamber to said combustion chamber at a point near the periphery of said cylinder, whereby the circulating working fluid is stratified relative to residual exhaust gas from a prior cycle of operation, distributed along the axis of said cylinder and, during the subsequent compression cycle, the working fluid is compressed, at least in part, into said ignition chamber through said connecting passage and substantially all residual exhaust gas is excluded therefrom.

4. In an internal combustion engine of the spark ignition type having a cylinder and a piston comprising:
a combustion chamber opposite said piston;
exhaust expulsion means opening into said combustion chamber;
working fluid intake means communicating with said combustion chamber;
intake manifold means in combination with said intake means to direct working fluid entering said combustion chamber therethrough to flow into said cylinder and circulate therein about the axis of said cylinder, whereby the working fluid is stratified relative to residual exhaust gas in said cylinder;
an ignition chamber separate from said combustion chamber;
connecting passage means joining said ignition chamber to said combustion chamber in substantial alignment with the periphery of said cylinder and joining the ignition chamber substantially tangentially, whereby working fluid entering said ignition chamber from said combustion chamber circulates therein about an axis; and
fuel supply means connected to said ignition chamber to supply a fuel-air mixture along said axis, whereby said fuel mixture is stratified radially relative to said working fluid entering said ignition chamber from said combustion chamber.

5. A combination as in claim 4, in which air enters said cylinder and fuel-injection means supply fuel to said air in close proximity to said intake means; and
means to vary the timing of fuel injection into said entering air relative to the timing of air entry into said cylinder are included whereby fuel injection begins when air entry begins, but terminates before the end of air entry.

6. A combination as in claim 4 in which operation of said fuel injection means begins after air entry into said cylinder and ends when air entry ends.

7. A combination as in claim 4 in which said ignition chamber is substantially cylindrical in form about an axis, and said connecting passage joins said ignition chamber tangentially with respect to said axis.

8. A combination as in claim 7 further comprising a fuel injector located on one end of said ignition chamber substantially on the axis thereof and opposite the connecting passage, and adapted to inject fuel along said axis.

9. A combination as in claim 4 in which said ignition chamber has a substantially cylindrical form about an axis with a fuel mixture inlet valve opening into said chamber on one end of said axis; and
a spark plug located in the wall of said ignition chamber with its electrodes extending substantially to the axis thereof and positioned near the inlet of said connecting passage on the opposite end of said chamber from said inlet valve.

10. A combination as in claim 9 in which the junction of said connecting passage with said ignition chamber is tangential with respect to the chamber axis and inclined with respect to said axis to direct working fluid entering said ignition chamber from said connecting passage to flow in a spiral path about said axis in a direction away from said spark plug and towards said mixture inlet valve.

11. A combination as in claim 4 in which the ignition chamber is substantially cylindrical in form with an annular passage at one end thereof, and said connecting passage joins said annular passage substantially tangentially.

12. A combination as in claim 11 in which the annular passage is partially restricted circumferentially where said passage opens into said ignition chamber.

13. A combination as in claim 4 in which the ignition chamber is formed as a figure of revolution about an axis, said combination further comprising:
a poppet-type fuel-air mixture inlet valve opening into said chamber substantially on said axis;
a circular shroud formed around said valve to direct fuel-air mixture entering said chamber through said valve to converge and flow along said axis;
said connecting passage joining said chamber substantially tangentially in a plane essentially normal to said axis at the end thereof opposite said valve.

14. A combination as in claim 4 further comprising:
a fuel-air mixture inlet valve that opens into said ignition chamber; and
fuel-air mixture compression means external to said cylinder adapted to force a fuel-air mixture into said ignition chamber through said inlet valve concurrently with compression in said cylinder.

15. A combination as in claim 4 further comprising:
compression means external to said cylinder to force fuel-air mixture into said cylinder through said inlet means at a predetermined pressure; and
air compression means external to said cylinder opening into said inlet manifold adjacent said inlet means adapted to force air momentarily into said manifold at a pressure in excess of said predetermined pressure while said mixture is entering said cylinder to momentarily interrupt said mixture flow.

16. A combination as in claim 4 further comprising:
adjustable restrictive means provided in said inlet manifold adjacent said inlet means whereby the velocity of gases entering said cylinder can be controlled.

17. A combination as in claim 4 further comprising:
an air pump of substantially fixed displacement per pump cycle for supplying air to said engine, and an air relief valve on the discharge side of said pump for controlling the quantity of air delivered to said engine.

18. A combination as in claim 4 further comprising:
a pump of substantially fixed displacement per pump cycle for supplying a fuel-air mixture to said engine, and a by-pass passage around said pump for recycling said mixture through said pump when the quantity required is less than the capacity of said pump, and valve means in said by-pass to control the quantity of mixture delivered to said engine.

19. A combination as in claim 4 in which said exhaust expulsion means and working fluid intake means are poppet valves.

20. A combination as in claim 19 in which two intake valves are located substantially opposite each other; and
passage means oriented to direct working fluid into said cylinder through said intake valves in the same hand of rotation about the cylinder axis.

21. A combination as in claim 19 further comprising:
dual intake passages connected to said intake valve, comprising a first passage supplied with air, and a second passage supplied with a fuel-air mixture; and
phasing means associated with said first and second passages whereby during the cylinder charging cycle of said engine air is supplied first and fuel-air mixture second, in sequence.

22. A combination as in claim 19 further comprising:
dual intake passages connected to said intake valves, comprising a first passage supplied with air, and a second passage supplied with a fuel-air mixture; and
phasing means associated with said first and second passages whereby during the cylinder charging cycle of said engine fuel-air mixture is supplied first and air second, in sequence.

23. A combination as in claim 19 further comprising:
a valve seat for said poppet inlet valve;
a first passage substantially parallel to the stem of said poppet valve, extending away from said seat with the stem in the wall of said passage; and
a second passage joining said first passage and extending away from said valve stem to form a U-shaped passage from the second passage, along the valve stem and across the half of said poppet valve head directly below the first passage, whereby working fluid flowing into said cylinder from said second passage passes in a smooth curve from said passage to the cylinder without dividing around said valve stem and flows across half of said valve head in a smooth substantially non-turbulent flow.

24. A combination as in claim 19 in which said combustion chamber is in the form of a hemispherical chamber which is flattened in its central region around said exhaust valve, and with the intake valve seated in the peripheral curved section of said chamber, said valve being too large in diameter to fit the curved chamber wall and extending therefore into a curved recess adjacent the central exhaust valve and in which said recess acts to shield the intake valve from contact with exhaust gases escaping from said cylinder through said exhaust valve while said intake valve is also open and new working fluid is entering the cylinder.

25. A combination as in claim 19 further comprising:
a first connecting passage from said ignition chamber to said combustion chamber; and
a second connecting passage from said ignition chamber to said combustion chamber;
the openings of said first and second connecting passages into said combustion chamber being arranged on substantially opposite sides of the cylinder axis and oriented to direct working fluid flow from said ignition chamber to said combustion chamber in substantially opposite directions to form a couple centered about said cylinder axis.

26. A combination as in claim 4 in which said connecting passage joins said combustion chamber substantially tangentially and is oriented to direct working fluid flow through said passage into said cylinder to circulate therein in a hand of rotation opposite to that of working fluid entering said cylinder through said intake manifold means.

27. A combination as in claim 26 in which said passage joins said combustion chamber substantially in a plane normal to the axis of said cylinder.

28. In an internal combustion engine of the two cycle, spark ignition type having a cylinder and piston, a combustion chamber opposite said piston, exhaust expulsion means substantially on the axis of said cylinder, and an ignition chamber separate from said combustion chamber but in direct communication through a connecting passage, the combination of:

means for dividing the fuel supplied to said engine into an ignition portion for said ignition chamber and a power portion for said combustion chamber to affect a first stratification;

means for establishing an axial circulation in said cylinder with a fuel-air mixture circulating around axially positioned exhaust gas in a second stratification; and means for establishing an axial circulation in said ignition chamber with excess air circulating around an axially positioned fuel-air mixture to establish a third or triple stratification in said engine.

29. A combination as in claim 28 in which the fuel-air mixture circulates around an axially positioned air body in said ignition chamber.

30. In an internal combustion engine of the spark ignition type having a cylinder and piston and combustion chamber substantially co-axial with said cylinder, exhaust expulsion means opening into said combustion chamber substantially on the axis of said cylinder, working fluid inlet means opening tangentially into said cylinder and combustion chamber space adjacent the periphery of said cylinder, and a separate ignition chamber in direct communication with said combustion chamber through a passage, the method of charging the ignition chamber with fuel without loss of fuel into the combustion chamber, which includes as steps:

directing said working fluid tangentially into said cylinder through said peripheral inlet means to establish a substantial circulation velocity inside said cylinder while displacing exhaust gas from a previous cycle of operation through said axially positioned exhaust expulsion means;

subsequently compressing said working fluid into said ignition chamber through said connecting means, at least in part; and supplying fuel to said chamber during compression at a rate such that the volume of fuel vapors from said supplied fuel never exceeds the capacity of said chamber as the density and pressure of working fluid and fuel vapors increases.

31. A method of operation as in claim 30, but with the fuel supplied as a pre-mixed fuel-air mixture, and delivered to said ignition chamber during the compression cycle at a rate and pressure to substantially match the cylinder pressure whereby the ignition chamber is never filled in excess of its capacity to hold the said fuel-air mixture.

32. A method of operation as in claim 31 in which the ignition flame originates in an ignition chamber separate from the combustion chamber and includes the additional steps:

filling said ignition chamber, at least in part, with a substantially stoichiometric fuel-air mixture by forcing in excess air in a stream which is directed to flow around said mixture in a circulation about an axis passing through said mixture, and in stratified relation thereto; and igniting said fuel-air mixture at a point substantially on said axis.

33. A method of operation as in claim 30, but including the additional steps to vary the power of the engine;

varying the quantity of fuel supplied to said ignition chamber from a minimum to the maximum quantity said chamber will contain without loss of fuel to the cylinder; thereafter holding the quantity of fuel supplied to said ignition chamber substantially constant while adding fuel in variable quantity to said working fluid supplied to said cylinder to increase the power of said engine.

34. In an internal combustion engine of the spark ignition type having a cylinder and piston and combustion chamber substantially co-axial with said cylinder, exhaust expulsion means opening into said combustion chamber substantially on the axis of said cylinder and fuel-air mixture inlet means opening tangentially into said cylinder and combustion chamber space adjacent the periphery of said cylinder, the method of charging said chamber with a fuel-air mixture and igniting said mixture, which includes as steps:

directing said fuel-air mixture tangentially into said cylinder through said peripheral inlet means to establish a substantial circulation velocity inside said cylinder in a given hand about said cylinder axis while displacing exhaust gas in said cylinder from a previous cycle of operation through said axially positioned exhaust expulsion means;

compressing said fuel-air mixture into said combustion chamber; and directing an ignition flame with substantial velocity essentially tangentially into said combustion chamber to establish a circulation therein about the length axis of said cylinder in a hand of rotation opposite to that of said circulating fuel-air mixture, to significantly retard the rate of rotation of said fuel-air mixture while igniting said mixture.

35. A method of operation as in claim 34 which includes a plurality of ignition flames directed into said combustion chamber in the same hand of rotation, but opposite to that of the hand of rotation of said fuel-air mixture therein.

* * * * *